(12) United States Patent
Whitten

(10) Patent No.: US 7,599,380 B2
(45) Date of Patent: Oct. 6, 2009

(54) RESETTING A MULTIMEDIA TERMINAL ADAPTER

(75) Inventor: Robert C. Whitten, Kennesaw, GA (US)

(73) Assignee: Cox Communications, Inc., Atlanta, GA (US)

( * ) Notice: Subject to any disclaimer, the term of this patent is extended or adjusted under 35 U.S.C. 154(b) by 490 days.

(21) Appl. No.: 11/580,330

(22) Filed: Oct. 13, 2006

(65) Prior Publication Data

US 2008/0089242 A1 Apr. 17, 2008

(51) Int. Cl.
*H04L 12/56* (2006.01)

(52) U.S. Cl. .................. 370/410; 725/111; 725/129; 725/152; 709/221

(58) Field of Classification Search .................. None
See application file for complete search history.

(56) References Cited

U.S. PATENT DOCUMENTS

| | | | | |
|---|---|---|---|---|
| 6,023,464 A | * | 2/2000 | Woundy | 370/352 |
| 7,293,078 B2 | * | 11/2007 | Danforth | 709/222 |
| 7,376,718 B2 | * | 5/2008 | Gould et al. | 709/220 |
| 2003/0067927 A1 | * | 4/2003 | Nair et al. | 370/401 |
| 2003/0074429 A1 | * | 4/2003 | Gieseke et al. | 709/221 |
| 2004/0090968 A1 | * | 5/2004 | Kimber et al. | 370/395.54 |
| 2005/0038880 A1 | * | 2/2005 | Danforth | 709/222 |
| 2005/0076386 A1 | * | 4/2005 | Carter et al. | 725/111 |

* cited by examiner

*Primary Examiner*—Daniel J Ryman
*Assistant Examiner*—Brian Roberts
(74) *Attorney, Agent, or Firm*—Merchant & Gould

(57) ABSTRACT

A plurality of network devices may be reset. In order to reset the plurality of network devices, a first file may be received including a plurality of host names corresponding to a plurality of network devices. Next, a second file may be received comprising a plurality of security keys respectively indexed with a plurality of network device IDs. Then, data may be created based on the first file and the second file. The data may include a plurality of qualified names each respectively corresponding to each of the plurality of network devices. The data may also include a plurality of security keys each respectively corresponding to each of the plurality of network devices. Next, the data may be sent to a programming module configured to send reset signals to each of the plurality of network devices.

20 Claims, 4 Drawing Sheets

RESETTING A MULTIMEDIA TERMINAL ADAPTER

BACKGROUND

Embedded multimedia terminal adapters (EMTAs) are data over cable service interface specification (DOCSIS) based cable modems with multimedia terminal adapters (MTAs) embedded in them. Service providers utilizes EMTAs to provide, for example, telephone service and Internet access to subscribers. In more detail, EMTAs are customer premise equipment that connect to a hybrid fiber-coax (HFC) network and convert voice over IP (VoIP) packets into analog audio streams to allow standard phones to be used by a subscriber. Particularly, the EMTA's MTA portion is used to provide this VoIP telephone service to the subscriber. In addition to VoIP service, EMTAs also allow the subscriber to access the Internet.

The conventional reset strategy is to reset (i.e. reboot) the entire EMTA whenever just the MTA portion needs to be reset. A common reason for resetting the MTA is to apply an updated configuration to the MTA. Resetting the entire EMTA when just the MTA needs resetting often causes problems because this conventional strategy causes, in addition to lost VoIP service, a loss in Internet service and uses more reset time than necessary to just reset the MTA. In some situations, due to the amount of downtime created for both VoIP telephone service and Internet service, resetting the entire EMTA is not desirable. Consequently, it may be desirable to reset only the EMTA's MTA portion while keeping other portions of the EMTA in service. In addition to keeping Internet access available by resetting only the MTA portion, the length of phone service outage experienced by the customer is reduced by only resetting the EMTA's MTA portion; This is because it takes less time to reset just the MTA as compared to setting the entire EMTA.

SUMMARY

Resetting network devices may be provided. This Summary is provided to introduce a selection of concepts in a simplified form that are further described below in the Detailed Description. This Summary is not intended to identify key features or essential features of the claimed subject matter. Nor is this Summary intended to be used to limit the scope of the claimed subject matter.

A plurality of network devices may be reset. In order to reset the plurality of network devices, a first file may be received including a plurality of host names corresponding to a plurality of network devices. Next, a second file may be received comprising a plurality of security keys respectively indexed with a plurality of network device IDs. Then, data may be created based on the first file and the second file. The data may include a plurality of qualified names each respectively corresponding to each of the plurality of network devices. The data may also include a plurality of security keys each respectively corresponding to each of the plurality of network devices. Next, the data may be sent to a programming module configured to send reset signals to each of the plurality of network devices.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
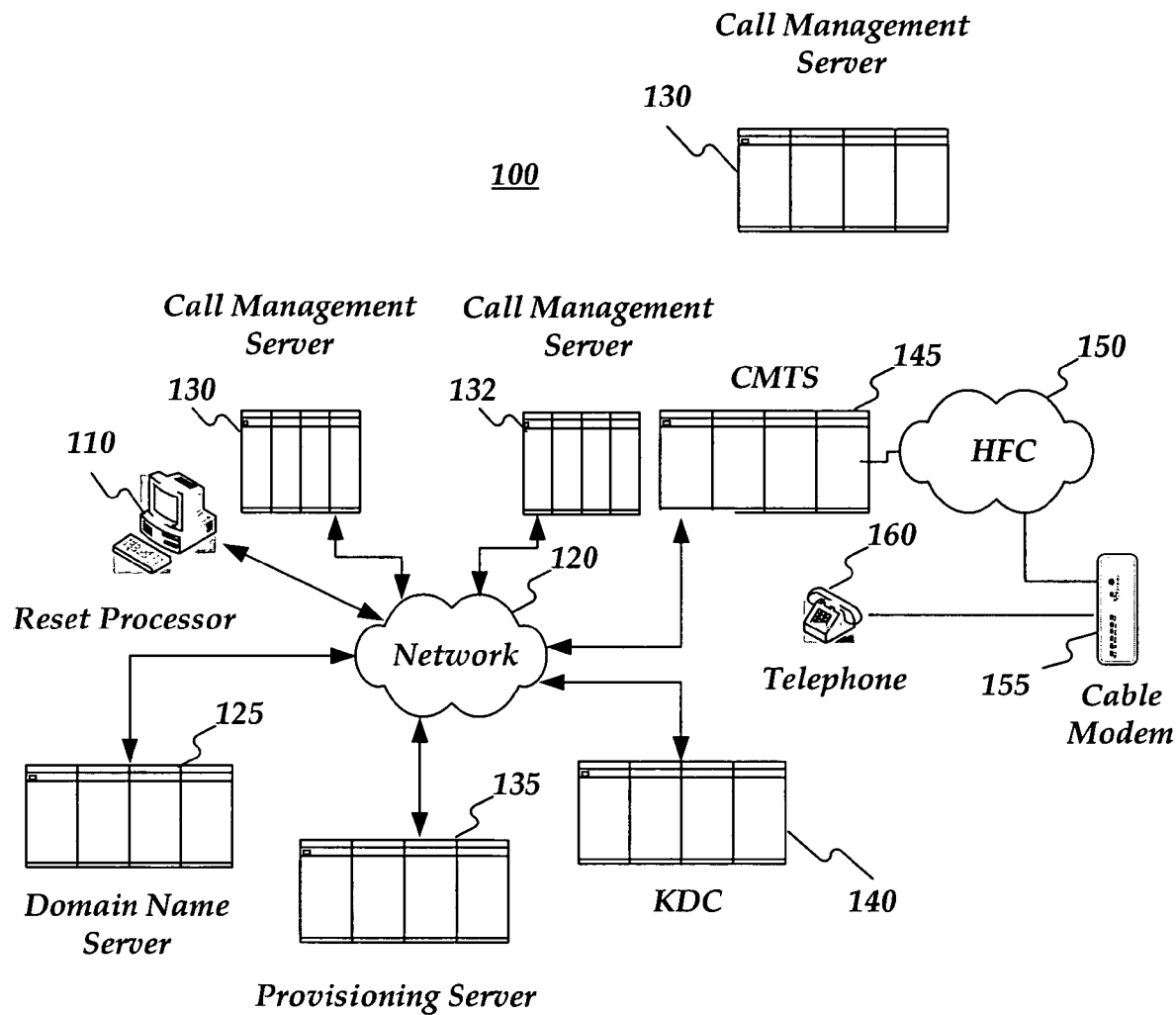
FIG. 1 is a block diagram of an operating environment including a system for resetting network devices.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Consistent with embodiments of the present invention, MTAs may be reset. In a network, service providers may utilize EMTAs to provide, for example, VoIP telephone service and Internet access to subscribers. For example, EMTAs may comprise customer premise equipment that connect to an HFC network and convert, for example, VoIP packets into analog audio streams. This allows, for example, standard phones to be used by a subscriber on a HFC network to participate in VoIP services. In particular, the EMTA's MTA portion is used to provide VoIP telephone service to the subscriber. In addition to the MTA, other EMTA portions may be used to provide the subscriber with Internet access.

The conventional strategy is to reset all portions of the EMTA even when just the MTA portion needs to be reset. As stated above, this often causes problems because the conventional strategy causes needless loss in Internet service because the EMTA portion providing Internet access is reset when the MTA is reset in conventional systems. Moreover, resetting all portions of the EMTA may create more subscriber down time for the EMTA because it takes longer to reset all portions of the EMTA than just resetting the MTA. Consequently, due to the amount of downtime created for both the VoIP telephone service and Internet service, resetting the entire EMTA is not desirable when only the MTA needs resetting.

Consistent with embodiments of the invention, one reason to reset the MTA may be to cause the MTA to operate from a different switch in the HFC network. For example, the switch in the HFC network currently serving the MTA may be reaching its capacity and the service provider may want the MTA to operate from a different switch in the HFC network. Consequently, it may be desirable to reset only the EMTA's MTA portion to, for example, operate from a different switch in the HFC network.

FIG. 1 is a block diagram of an operating environment including a system 100 for resetting network devices. As shown in FIG. 1, system 100 may comprise a reset processor 110, a network 120, a domain name server 125, a call management server 130, a call management server 132, a provisioning server 135, a key distribution center (KDC) 140, a cable modem termination system (CMTS) 145, an HFC network 150, a cable modem 155, and a telephone 160.

Figure 2:
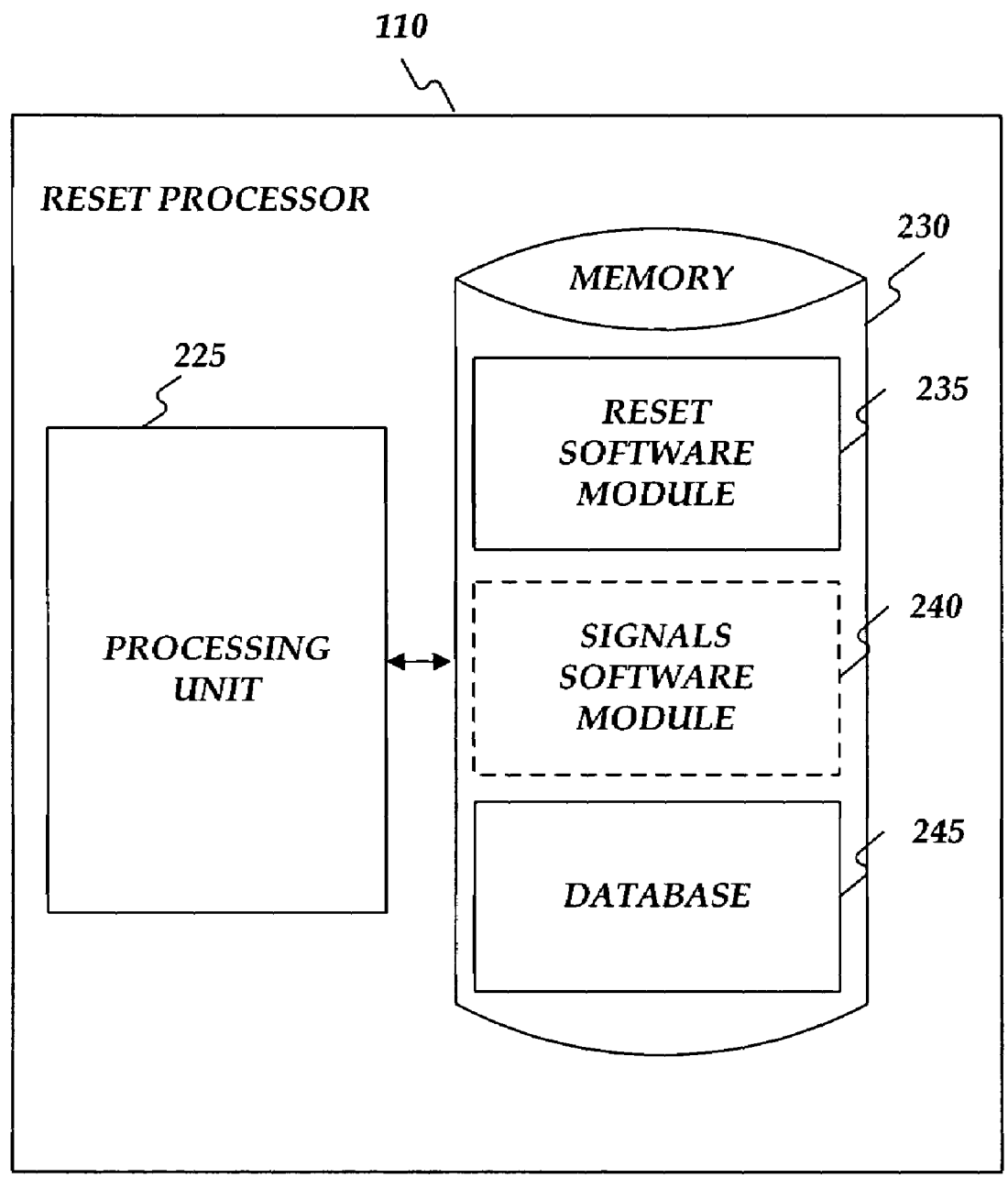
FIG. 2 is a block diagram of a reset processor.
Figure 3:
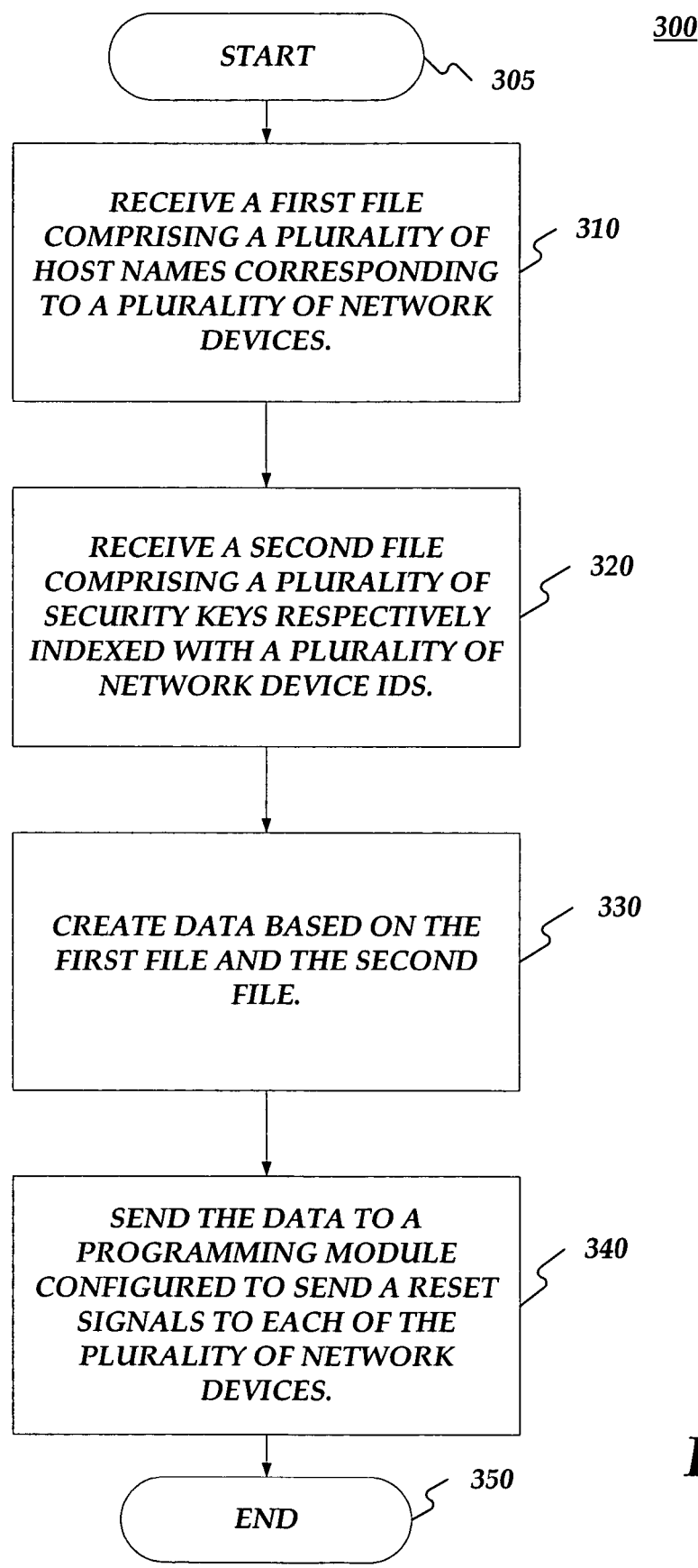
FIG. 3 is a flow chart of a method for resetting network devices.

As described in greater detail with respect to FIG. 2 and FIG. 3, reset processor 110 may be configured to reset an MTA embedded within cable modem 155. Network 120 may comprise, for example, a local area network (LAN) or a wide area network (WAN). When a LAN is used as network 120, a network interface located at any of the elements connected to network 120 may be used to interconnect any of the elements. When network 120 is implemented in a WAN networking environment, such as the Internet, the elements may typically include an internal or external modem (not shown) or other means for establishing communications over the WAN. Further, in utilizing network 120, data sent over network 120 may be encrypted to insure data security by using encryption/decryption techniques.

In addition to utilizing a wire line communications system as network 120, a wireless communications system, or a combination of wire line and wireless may be utilized as network 120 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The elements communicating in the wireless environment can be any mobile terminal. Wireless data may include, but is not limited to, paging, text messaging, e-mail, Internet access and other specialized data applications specifically excluding or including voice transmission. For example, the elements communicating may communicate across a wireless interface such as, for example, a cellular interface (e.g., general packet radio system (GPRS), enhanced data rates for global evolution (EDGE), global system for mobile communications (GSM)), a wireless local area network interface (e.g., WLAN, IEEE 802.11), a bluetooth interface, another RF communication interface, and/or an optical interface. The aforementioned are examples and any wireless interface may be used.

Domain name server 125, may allow a host name to be associated with its corresponding IP address or visa versa. For example, domain name server 125 may receive a service request and may provide an IP address associated with a corresponding domain name listed in the service request. Call management server 130 may provide, for example, a plurality of host names corresponding to a plurality of network devices (e.g. MTAs embedded in cable modems) that the service provider previously designated to be changed to operate on the first switch (e.g. call management server 130) in system 100 different from the second switch (e.g. call management server 132) in system 100. Provisioning server 135 may be used to provide, for example, a plurality of security keys respectively indexed with a plurality of network device IDs comprising, for example, media access control (MAC) addresses. KDC 140 may be used to create and send the security keys to provisioning server 135 when, for example, cable modem 155 is first initialized.

CMTS 145 may comprise a computerized device that enables cable modems to send and receive packets over, for example, the Internet. HFC network 150 may comprise a communications network (e.g. a cable TV network) that uses a combination of optical fibers and coaxial cable. The fiber may provide a high-speed backbone and the coax may be used to connect end users (e.g. subscribers) to the backbone. Such networks may use, for example, a DOCSIS CMTS at a head end and a DOCSIS cable modem at a customer (e.g. subscriber) premises, providing bidirectional paths and Internet access using HFC network 150. Cable modem 155 may comprise a DOCSIS based cable modem and may include an EMTA likewise including an MTA. Consistent with embodiments of the invention, a network device may comprise, but is not limited to an MTA, for example, embedded in a cable modem as described above. Telephone 160 may comprise a telephone capable of being utilized for VoIP service over cable modem 155 consistent with embodiments of the present invention.

An embodiment consistent with the invention may comprise a system for resetting network devices. The system may comprise a memory storage and a processing unit coupled to the memory storage. The processing unit may be operative to receive a first file comprising a plurality of host names corresponding to a plurality of network devices. The processing unit may be further operative to receive a second file comprising a plurality of security keys respectively indexed with a plurality of network device IDs. In addition, the processing unit may be operative to create data based on the first file and the second file. The data may comprise a plurality of qualified names each respectively corresponding to each of the plurality of network devices. The data may further comprise a plurality of security keys each respectively corresponding to each of the plurality of network devices. Moreover, the processing unit may be operative to send the data to a programming module configured to send reset signals to each of the plurality of network devices.

Consistent with an embodiment of the present invention, the aforementioned memory, processing unit, and other components may be implemented in a system for resetting network devices, such as system 100 as described above with respect to FIG. 1. Any suitable combination of hardware, software, and/or firmware may be used to implement the memory, processing unit, or other components. By way of example, the memory, processing unit, or other components may be implemented with reset processor 110 in combination with system 100. The aforementioned system and processor are exemplary and other systems and processors may comprise the aforementioned memory, processing unit, or other components, consistent with embodiments of the present invention.

FIG. 2 shows reset processor 110 of FIG. 1 consistent with an embodiment of the invention. As shown in FIG. 2, reset processor 110 may include a processing unit 225 and a memory 230. Memory 230 may include a reset software module 235, a signals software module 240, and a database 245. While executing on processing unit 225, reset software module 235 may perform processes for resetting network devices, including, for example, one or more of the stages of a method 300 described below with respect to FIG. 3. Signals software module 240 may comprise a programming module configured to send reset signals to each of the plurality of network devices as described below in greater detail. Signals software module 240 may be located on reset processor 110 or on another processor or element (not shown) connected, for example, to network 120. Database 245 may be used, for example, to temporally store various information while executing one or more stages of a method 300.

Reset processor 110 ("the processor") may be implemented using a personal computer, network computer, mainframe, or other similar microcomputer-based workstation. The processor may though comprise any type of computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, any of the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are examples and the processor may comprise other systems or devices.

FIG. 3 is a flow chart setting forth the general stages involved in a method 300 consistent with an embodiment of the invention for resetting network devices. Method 300 may be implemented using reset processor 110 as described in detail above with respect to FIG. 2. Ways to implement the stages of method 300 will be described in greater detail below. Method 300 may begin at starting block 305 and proceed to stage 310 where reset processor 110 may receive a first file (e.g. from call management server CMS 130) including a plurality of host names corresponding to a plurality of network devices. For example, the plurality of network devices to which the plurality of host names correspond may each comprise an MTA embedded in a DOCSIS based cable modem.

Moreover, the plurality of network devices identified in the first file may comprise MTAs resetable independent of other portions of their corresponding cable modems. As stated above, the plurality of network devices, for example, may be designated by a service provider to be changed to operate on the first switch (e.g. Call Management Server 130) different from the second switch (e.g. Call Management Server 132) from which the plurality of network devices currently operate. For example, the first switch (Call Management Server 130) currently serving a given MTA may be reaching its capacity and the service provider may wish to cause the MTA to operate from the second switch (Call Management Server 132) Furthermore, the plurality of network devices may comprise MTAs configured to provide VoIP telephone service, for example, over HFC network 150.

From stage 310, where reset processor 110 receives the first file, method 300 may advance to stage 320 where reset processor 110 may receive a second file (e.g. from provisioning server 135) comprising a plurality of security keys respectively indexed with a plurality of network device IDs. For example, the plurality of network device IDs may comprise MAC addresses respectively corresponding to the plurality of security keys. For example, reset processor 110 may send a reset signal to cable modem 155. Before cable modem 155 responses to the sent reset signal, cable modem 155 may parse the reset signal for a security key. If cable modem 155 determines that the received security key is the correct security key corresponding to cable modem 155, cable modem 155 may then execute instructions including reset instructions contained in the reset signal.

In order to first create a security key, when cable modem 155 is first provisioned on HFC network 150, cable modem 155 may query KDC 140 for its corresponding security key. In order to receive a security key, cable modem 155 may provide KDC 140 with cable modem 155's MAC address. Once cable modem 155's security key is created and associated with cable modem 155's MAC address, KDC 140 sends this information to provisioning server 135. Accordingly, this MAC address/security key information regarding cable modem 155 or, for that matter, MAC address/security key information regarding any network device connected to HFC network 150, for example, may be made available to reset processor 110 via provisioning server 135.

Once reset processor 110 receives the second file in stage 320, method 300 may continue to stage 330 where reset processor 110 may create data based on the first file and the second file. The data may comprise a plurality of qualified names each respectively corresponding to each of the plurality of network devices. The data may also include a plurality of security keys each respectively corresponding to each of the plurality of network devices. For example, reset processor 110 may take the information from the first file designating network devices to be reset and match the network devices identified in the first file with their corresponding security key identified in the second file. Because the network devices identified in the first file may be indexed by network IDs (e.g. MAC address included in there corresponding host names) and because the security keys in the second file may be indexed by network IDs (e.g. MAC address), reset processor 110 may cross reference the first file and the second file. The first and second files may be cross referenced to match the plurality of network devices identified in the first with their corresponding security keys identified in the second file.

Figure 4:
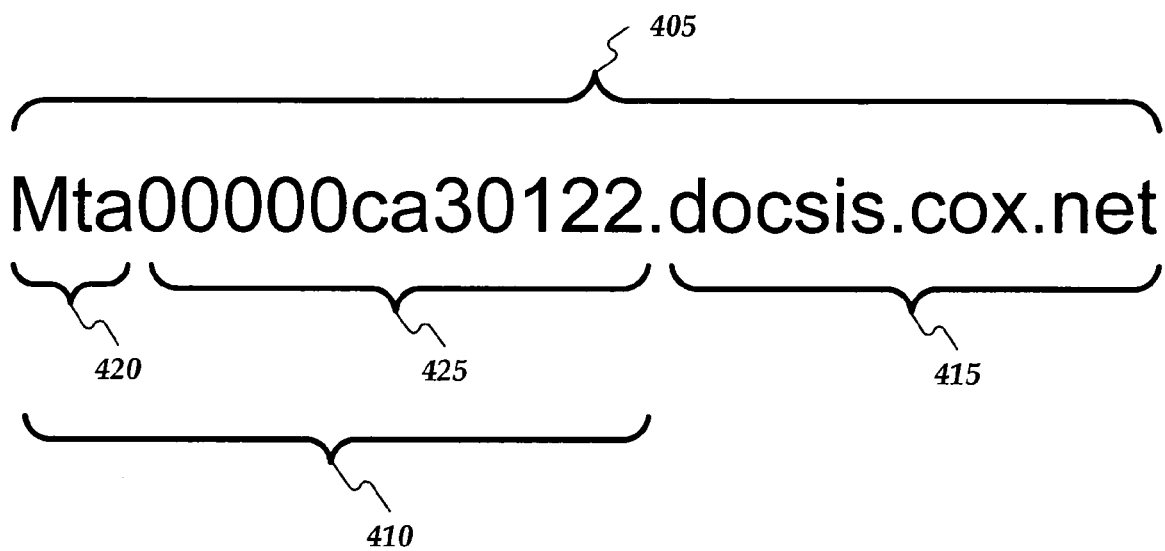
FIG. 4 is a diagram illustrating a fully qualified domain name.

Moreover, the plurality of qualified names included in the data created by reset processor 110 may comprise fully qualified domain names. For example, the plurality of qualified names may respectively comprise the plurality of host names with a domain name concatenated to the plurality of host names. For example, as shown in FIG. 4, fully qualified domain name (FQDN) 405 may include a host name 410 with a domain name 415 concatenated to the end of host name 410. Host name 410 may include a MAC address 425 preceded by a prefix 420. In this example, MAC address 425 may comprise the MAC address of cable modem 155. Furthermore, domain name 415 may correspond to the service provider operating HFC network 150.

After reset processor 110 creates the data based on the first file and the second file in stage 330, method 300 may proceed to stage 340 where reset processor 110 may send the data to a programming module configured to send reset signals to each of the plurality of network devices, for example, signals software module 240. The programming module configured to send reset signals to each of the plurality of network devices may be located on reset processor 110 or on another processor (not shown) connected, for example, to network 120. For example, this programming module may be configured to create the reset signals configured to cause the plurality of network devices to be changed to operate on the first switch (Call Management Server 130) different from the second switch (Call Management Server 132) from which the plurality of network devices current operate in system 100.

Furthermore, signals programming module 240 may be configured to send the plurality of qualified names to domain name server 125. In response, domain name server 125 may provide a plurality of Internet protocol (IP) addresses respectively corresponding to each of the plurality of qualified names. Signals programming module 240 may be further configured to receive the plurality of IP addresses from domain name server 125. For example, domain name server 125 may provide signals software module 240 cable modem 155's IP address based on cable modem 155's qualified name sent to domain name server 125.

In addition, signals software module 240 may be further configured to send the reset signals respectively to each of the received plurality of Internet protocol (IP) addresses respectively corresponding to each of the plurality of network devices. The reset signals may each respectively include a security key corresponding to a network device of the plurality of network devices for which each of the reset signals is sent. For example, signals software module 240 may send a reset signal to cable modem 155. Before cable modem 155 responses to the sent reset signal, cable modem 155 may parse the reset signal for a security key. If cable modem 155 determines that the received security key is the correct security key corresponding to cable modem 155, the cable modem 155 may then execute an instruction including reset instructions contained in the reset signal. In addition, reset processor 110 may receive a confirmation that at least one of the plurality of network devices has been reset. For example, cable modem 155 may send a confirmation to reset processor 110 that cable modem 155 has been reset. Once reset processor 110 sends the data to the programming module in stage 340, method 300 may then end at stage 350.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system.

The computer-usable or computer-readable medium may be, for example but not limited to, an electronic, magnetic, optical, electromagnetic, infrared, or semiconductor system, apparatus, or device. More specific computer-readable medium examples (a non-exhaustive list), the computer-readable medium may include the following: a portable computer diskette, a random access memory (RAM), a read-only memory (ROM), an erasable programmable read-only memory (EPROM or Flash memory), and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for resetting network devices, the method comprising:
   receiving a first file comprising a plurality of host names corresponding to a plurality of network devices;
   receiving a second file comprising a plurality of security keys respectively indexed with a plurality of network device IDs;
   creating data by a processing unit based on the first file and the second file, the data comprising a plurality of qualified names each respectively corresponding to each of the plurality of network devices and a plurality of security keys each respectively corresponding to each of the plurality of network devices; and
   sending the data to a programming module configured to send reset signals to each of the plurality of network devices.

2. The method of claim 1, wherein receiving the first file comprising the plurality of host names corresponding to the plurality of network devices comprises receiving the first file comprising the plurality of host names corresponding to the plurality of network devices comprising multimedia terminal adapters embedded in data over cable service interface specification (DOCSIS) based cable modems.

3. The method of claim 1, wherein receiving the first file comprising the plurality of host names corresponding to the plurality of network devices comprises receiving the first file comprising the plurality of host names corresponding to the plurality of network devices comprising multimedia terminal adapters embedded in data over cable service interface specification (DOCSIS) based cable modems wherein each of the multimedia terminal adapters are resettable independent of other portions of their corresponding cable modems.

4. The method of claim 1, wherein receiving the first file comprising the plurality of host names corresponding to the plurality of network devices comprises receiving the first file comprising the plurality of host names corresponding to the plurality of network devices comprising multimedia terminal adapters configured to provide voice over IP (VoIP) over a hybrid fiber-coax (HFC) network.

5. The method of claim 1, wherein receiving the first file comprising the plurality of host names corresponding to the plurality of network devices comprises receiving the first file comprising the plurality of host names corresponding to the plurality of network devices that a service provider designated to be changed to operate on a first switch different from a second switch from which the plurality of network devices current operate.

6. The method of claim 1, wherein receiving the first file comprising the plurality of host names corresponding to the plurality of network devices comprises receiving the first file comprising the plurality of host names corresponding to the plurality of network devices that a service provider designates to be changed to operate on a first switch different from a second switch from which the plurality of network devices current operate, the first switch and the second switch configured to operate in a network comprising a hybrid fiber-coax (HFC) network and other network service elements.

7. The method of claim 1, wherein receiving the first file comprises receiving the first file from a call management server (CMS).

8. The method of claim 1, wherein receiving the first file comprising the plurality of host names corresponding to the plurality of network devices comprises receiving the first file comprising the plurality of host names each respectively corresponding to a media access control (MAC) address of each of the plurality of network devices.

9. The method of claim 1, wherein receiving the second file comprising the plurality of security keys respectively indexed with the plurality of network device IDs comprises receiving the second file comprising the plurality of security keys respectively indexed with the plurality of network device IDs wherein the plurality of network device IDs comprise media access control (MAC) addresses.

10. The method of claim 1, wherein receiving the second file comprises receiving the second file from a provisioning server.

11. The method of claim 1, wherein creating the data by the processing unit based on the first file and the second file, the data comprising the plurality of qualified names comprises creating the data by the processing unit based on the first file and the second file, the data comprising the plurality of qualified names comprising fully qualified domain names.

12. The method of claim 1, wherein creating the data by the processing unit based on the first file and the second file, the data comprising the plurality of qualified names comprises creating the data by the processing unit based on the first file and the second file, the data comprising the plurality of qualified names respectively comprising the plurality of host names with a domain name concatenated to the plurality of host names.

13. The method of claim 1, wherein sending the data to the programming module configured to send the reset signals to each of the plurality of network devices comprises sending the data to the programming module configured to send the reset signals to each of the plurality of network devices, the programming module being configured to create the reset signals configured to cause the plurality of network devices to be changed to operate on a first switch different from a second switch from which the plurality of network devices current operate.

14. The method of claim 1, wherein sending the data to the programming module configured to send the reset signals to each of the plurality of network devices comprises sending the data to the programming module configured to:
send the plurality of qualified names to a domain name server configured to provide a plurality of Internet protocol (IP) addresses respectively corresponding to each of the plurality of qualified names;
receive the plurality of IP addresses from the domain name server; and
send the reset signals respectively to each of the received plurality of Internet protocol (IP) addresses respectively corresponding to each of the plurality of network devices, the reset signals each respectively including a security key corresponding a network device of the plurality of network devices for which each of the reset signals is sent.

15. The method of claim 1, further comprising receiving a confirmation that at least one of the plurality of network devices has been reset.

16. A system for resetting network devices, the system comprising:
a memory storage; and
a processing unit coupled to the memory storage, wherein the processing unit is operative to:
receive, from a call management server (CMS), a first file comprising a plurality of host names corresponding to a plurality of network devices comprising multimedia terminal adapters configured to provide voice over IP (VoIP) over a hybrid fiber-coax (HFC) network;
receive, from a provisioning server, a second file comprising a plurality of security keys respectively indexed with a plurality of network device IDs comprising media access control (MAC) addresses;
create data based on the first file and the second file, the data comprising a plurality of qualified names each respectively corresponding to each of the plurality of network devices and a plurality of security keys each respectively corresponding to each of the plurality of network devices wherein the plurality of qualified names respectively comprise the plurality of host names with a domain name concatenated to the plurality of host names; and
send the data to a programming module configured to send reset signals to each of the plurality of network devices, the programming module configured to:
send the plurality of qualified names to a domain name server configured to provide a plurality of Internet protocol (IP) addresses respectively corresponding to each of the plurality of qualified names;
receive the plurality of IP addresses from the domain name server; and
send the reset signals respectively to each of the received plurality of Internet protocol (IP) addresses respectively corresponding to each of the plurality of network devices, the reset signals each respectively including a security key corresponding a network device of the plurality of network devices for which each of the reset signals is sent.

17. The system of claim 16, wherein the processing unit being operative to receive the first file comprising the plurality of host names corresponding to the plurality of network devices comprises the processing unit being operative to receive the first file comprising the plurality of host names corresponding to the plurality of network devices that a service provider designated to be changed to operate on a first switch different from a second switch from which the plurality of network devices current operate.

18. The system of claim 16, wherein the processing unit being operative to receive the first file comprising the plurality of host names corresponding to the plurality of network devices comprises the processing unit being operative to receive the first file comprising the plurality of host names each respectively corresponding to a media access control (MAC) address of each of the plurality of network devices.

19. A computer-readable storage medium which stores a set of instructions which when executed performs a method for resetting network devices, the method executed by the set of instructions comprising:

receiving a first file comprising a plurality of host names corresponding to a plurality of network devices comprising multimedia terminal adapters embedded in data over cable service interface specification (DOCSIS) based cable modems wherein each of the multimedia terminal adapters are resettable independent of other portions of their corresponding cable modems;

receiving a second file comprising a plurality of security keys respectively indexed with a plurality of network device IDs;

creating data based on the first file and the second file, the data comprising a plurality of qualified names each respectively corresponding to each of the plurality of network devices and a plurality of security keys each respectively corresponding to each of the plurality of network devices, the plurality of qualified names comprising fully qualified domain names;

sending the data to a programming module configured to send reset signals to each of the plurality of network devices wherein the programming module is configured to send the reset signals to each of the plurality of network devices, the programming module being configured to create the reset signals configured to cause the plurality of network devices to be changed to operate on a first switch different from a second switch from which the plurality of network devices current operate; and receiving a confirmation that at least one of the plurality of network devices has been reset.

20. The computer-readable storage medium of claim 19, wherein receiving the first file comprising the plurality of host names corresponding to the plurality of network devices comprises receiving the first file comprising the plurality of host names corresponding to the plurality of network devices that a service provider designates to be changed to operate on a first switch different from a second switch from which the plurality of network devices current operate, the first switch and the second switch configured to operate in a network comprising a hybrid fiber-coax (HFC) network.

* * * * *